United States Patent
Hyväkkä

Patent Number: 6,052,459
Date of Patent: Apr. 18, 2000

[54] METHOD AND ARRANGEMENT FOR SIGNALLING SYSTEMS

[75] Inventor: Jouko Hyväkkä, Espoo, Finland

[73] Assignee: Telefonaktieoblaget LM Ericsson, Stockholm, Sweden

[21] Appl. No.: 08/993,779

[22] Filed: Dec. 18, 1997

[30] Foreign Application Priority Data

Dec. 19, 1996 [FI] Finland ................................... 965118

[51] Int. Cl.[7] ................................................. H04M 7/00
[52] U.S. Cl. ........................ 379/229; 379/350; 379/399; 370/410
[58] Field of Search ................................. 379/229, 90.01, 379/294, 399, 350, 280, 286, 230, 207; 370/352, 386, 410

[56] References Cited

U.S. PATENT DOCUMENTS

| | | | |
|---|---|---|---|
| 5,121,425 | 6/1992 | Reichelt | 379/362 |
| 5,140,590 | 8/1992 | Gertsman et al. | 379/232 |
| 5,307,403 | 4/1994 | Reichelt | 379/286 |
| 5,483,110 | 1/1996 | Koide et al. | 379/90.01 |
| 5,566,173 | 10/1996 | Steinbrecher | 370/466 |
| 5,579,311 | 11/1996 | Chopping et al. | 370/352 |
| 5,598,467 | 1/1997 | Bremner et al. | 379/398 |
| 5,740,235 | 4/1998 | Lester et al. | 379/170 |

FOREIGN PATENT DOCUMENTS 2240905  8/1991  United Kingdom .

OTHER PUBLICATIONS

Derwent Acc No. 89–235136/198933, English language Abstract for EP0327686 (Undated).

*Primary Examiner*—Krista Zele
*Assistant Examiner*—Benny Q. Tieu
*Attorney, Agent, or Firm*—Burns, Doane, Swecker & Mathis, L.L.P.

[57] ABSTRACT

The invention concerns a method and an arrangement for selecting a signalling system. The inventive method comprises the steps of storing an information about various parameters of alternative signalling systems of different markets into a storage device of an arrangement, selecting one of the stored alternative signalling systems by programmable control device, transmitting a logical value corresponding the selected signalling system to field effect type switching device provided in the arrangement, and controlling the field effect type switching device by the electrical control signal such that the selected signalling system is provided. The control arrangement comprises a device for performing the method described above.

13 Claims, 2 Drawing Sheets

METHOD AND ARRANGEMENT FOR SIGNALLING SYSTEMS

FIELD OF THE INVENTION

The present invention relates to a method for analog signalling systems and more specifically, to a method for selecting of a signalling system for a specific market among various alternative signalling systems. The invention relates further to an arrangement realizing the inventive method.

BACKGROUND OF THE INVENTION

In different transmission systems, e.g. in analog or digital telecommunication systems, the system transmitting voice, sound, data etc. signal has to be adapted according to different requirements set by different markets. In this context the term 'market' is intended to generally mean one country, market area, standard or similar having signalling system parameters, such as impedance, voltage, signal type and similar, of its own. In other words, two markets, such as e.g. Germany and USA, do have different signalling parameters, ie. signal types, communication protocols, impedances, voltages etc. A transmission system, in turn, can include all kinds of tele-equipment, such as various exchanges and switching devices, e.g. transistors, relays and similar devices.

There is a need for making an easy and reliable selection between various signalling systems to meet the requirements of the several markets. However, the known arrangements, eg. circuit boards, have not been able to perform a software aided selection between the different markets since they are provided with only e.g. one single switch due to, for instance, essential large space requirements, power consumption, reliability and costs of one such switch. Different signalling stages (voltage levels) for the switch (0V, +5V, −48V, etc.) have been selected by manually changing the strappings on a board, and thus the software based selection has caused difficulties.

The known telephone exchange means (such as Telefonaktiebolaget LM Ericsson's MD110) are, in turn, provided with a standard backplane interface and board positions suitable for various kinds of circuit boards or cards, such as digital or analog trunk line boards, extension boards and similar.

Each such board position has a certain maximum power or watt consumption. The boards of known type consume an essentially great amount of power due to, among other things, auxiliary devices, such as relays, transistors and similar and therefore the functions of one board are generally divided into several boards to avoid an exceeding of said power limitation. The prior art manner to form the required signalling system, according to which alternative components were positioned on the same board, requires an additional space due to space requirements of the components on the board, and therefore more boards were needed. The boards are of standard size, and therefore the number of relatively big components positioned on one single board is limited. In addition, the number of channels has been low in known arrangements. This all together has led into a high number of circuit boards or cards in one switchboard or telephone exchange, which in turn has lead to a high space requirement and power consumption.

SUMMARY OF THE INVENTION

Therefore, it is an object of the present invention to overcome the disadvantages of the prior art solutions and to provide an improvement for the selection of a suitable signalling system.

An object of the present invention is also to provide a method and an arrangement in which one single circuitry can be set by software based control means to correspond the different requirements set by different markets.

An object of the present invention is also to provide a method and an arrangement, by means of which the number of circuit boards in one switch means can be reduced.

Another object of the present invention is to provide a method and an arrangement, by means of which the size and the costs of the switch means can be reduced.

It is also an object of the present invention to provide a method and an arrangement, by means of which the assembly of switch means is facilitated, and a possibility for incorrect settings is minimized.

It is also an object of the present invention to provide a method and an arrangement, by means of which the power dissipation of the switch means can be reduced and the reliability thereof can be enhanced.

A still further object of the present invention is to provide a method and an arrangement which is suitable for analog or digital telephone equipment having a high number of different, alternative analog signalling parameters.

A yet another object of the present invention is to provide a method and an arrangement, by means of which the EMC (Electromagnetic Compatibility) disturbances are decreased.

Other objects and advantages of the present invention will be brought out in the following part of the specification taken in conjunction with the accompanying drawings.

The present invention may usually be used in a per se known switchboard provided with a standard backplane interface and board positions suitable for various kinds of circuit boards or cards, such as a digital or analog trunk line boards, extension boards etc. The circuitry according to the invention is provided with programmable control means adapted to control a number of switching means mounted on the circuit board by logical values which are converted to correspond "1" and "0". The control means may preferably comprise a circuit board provided with central processing unit, CPU, and memory means, such as ROM. An information of various markets and the required parameters is stored in the memory means. The control means are adapted to make the selection between various alternative signalling systems.

More precisely, the method for selecting a signalling system, comprises the steps of storing an information about various parameters of alternative signalling systems of different markets into a memory means of an arrangement, selecting one of the stored alternative signalling systems by programmable control means, transmitting a logical value corresponding said selected signalling system to field effect type switching means provided in the circuitry, and controlling said field effect type switching means by said electrical control signal such that the selected signalling system is provided.

A control system arrangement for selecting a signalling system having different current/voltage levels according to the present invention comprises a memory means for storing information about various parameters of alternative signalling systems of different markets, programmable control means operationally connected to said memory means for selecting one of the alternative signalling systems and at least one field effect type switching means operationally connected to said programmable control means, said at least one field effect type switching means being capable of providing the selected signalling system and being provided with an output for a signalling channel.

According to a preferred embodiment a circuit board realizing the invention is provided with switches using MOSFET (metal-oxide-semiconductor field-effect transistor, MOS-transistor) type switches. A MOSFET type switch is especially advantageous as the performance thereof is high and control energy requirement thereof and the size thereof is essentially smaller than are the same for the conventional switches, such as relays. This is due to the structure of the MOSFET, wherein the lattice (or control input) is isolated from the other parts thereof, said MOSFET controlling the voltage or the current.

Several advantages are obtained by means of the present invention. The solution provides a simple, reliable and software controllable manner for the selecting the correct signalling system for various different markets. A precisely correct signalling type and system can be selected by means of an economical arrangement consisting of per se known components. The disadvantageous affects of various impractical solutions of different markets can be eliminated. A need for a great amount of different kinds of equipment and components in one switching apparatus is eliminated since the same base equipment consisting of smaller amount of components than in the conventional switching apparatus can be used for various signalling systems and markets. The number of circuit boards in one switching apparatus is also decreased. In addition, the power consumption of the switching apparatus is decreased and minimized and thus the performance thereof is increased. In addition, the EMC (Electromagnetic compatibility) disturbances can be reduced so that the device tolerates the disturbances from other devices and vice versa.

In the following the invention and the other objects and advantages thereof will be described by way of examples with reference to the annexed drawings, in which similar reference characters throughout the various figures refer to similar features. It should be understood that the following exemplifying description of the invention is not meant to restrict the invention to the specific forms presented in this connection but rather the present invention is meant to cover all modifications, similarities and alternatives which are included in the spirit and scope of the invention, as defined by the appended claims.

DETAILED DESCRIPTION OF THE DRAWINGS

Figure 1:
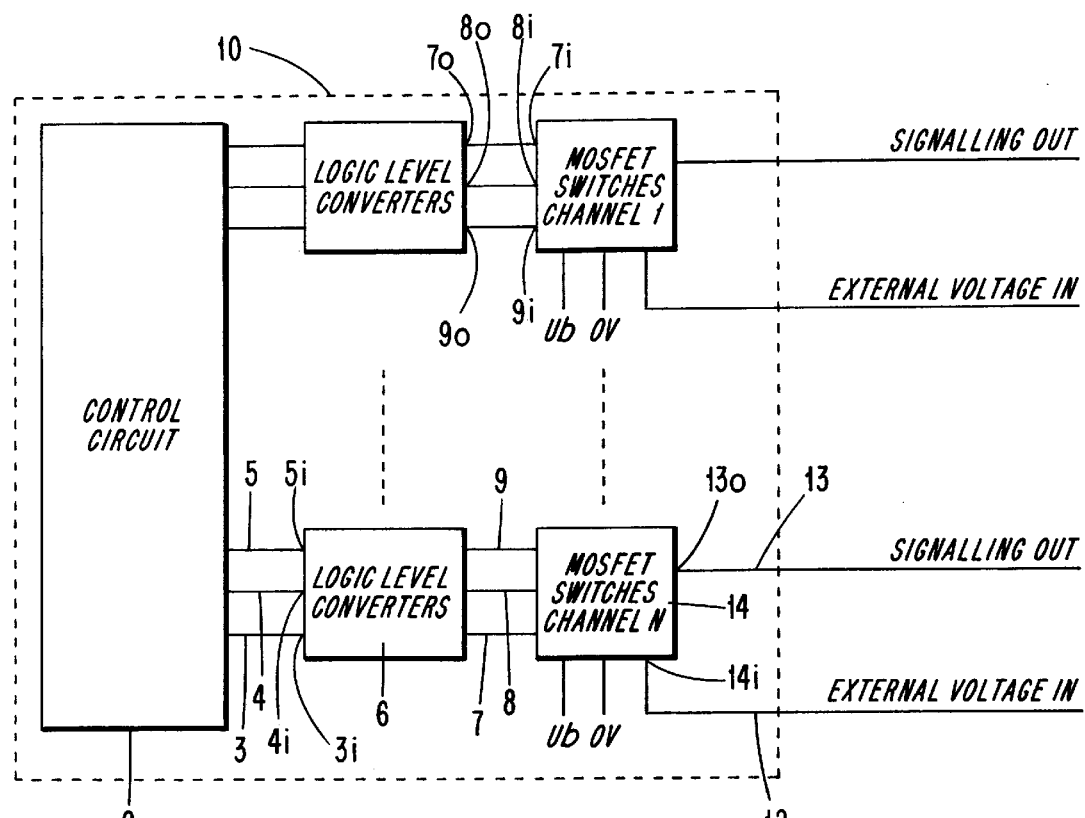
FIG. 1 is a schematic presentation of one preferred embodiment according to the present invention.

FIG. 1 discloses a circuitry 10 according to the present invention. A control circuit 2 is connected to several signalling channels 13, the number of possible channels being shown as to be from 1 to N. In other words, the number of channels can be freely chosen and could, for example, be 2 or 10 or 100 channels. The control circuit 2 includes ROM memory means, and information concerning all various signalling systems in various markets is stored in said ROM memory means. For example, the following kind of table may be stored in the ROM memory means as a pseudo code:

|  | IDLE | ANSWER | SEIZURE |
| --- | --- | --- | --- |
| case market 1 | −48 V | 0 V | 0 V |
| case market 2 | all switches open | 0 V | 0 V |
| case market 3 | 0 V | external voltage | external voltage |
| case market N | 0 V | −48 V | −48 V |

In the above the given values are the signalling-out values. IDLE is intented to mean the standstill/standby state before a call, ANSWER the receiving/call state and SEIZURE the call initiating state.

Figure 3:
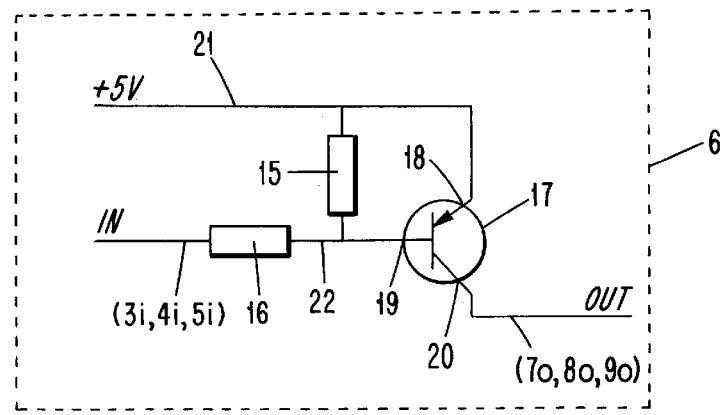
FIG. 3 is a schematic presentation of one logic level converter used in the present invention.

Each signalling channel 13 comprises logic lever converter means 6 which are operationally connected to the programmable control circuit 2. One more precise example of such converter means 6 and connections thereof is shown in FIG. 3 and explained in more detail in that context. In this example said connection comprises three conducts 3, 4 and 5 connected to inputs 3i, 4i and 5i of the converter means 6, respectively. Outputs 7o, 8o and 9o of the converter means 6 are, in turn, connected through conducts 7, 8 and 9 to inputs 7i, 8i and 9i of a MOSFET switch means 14.

A MOSFET (a metal-oxide-semiconductor field-effect transistor, a MOS-transistor) is a field effect type transistor which is controlled by voltage. Power consumption, size and price of the MOS-transistors are essentially lower than in the prior art switches, and thus when they are used as switches (ie. instead of relays) it is possible to make a large number of various connections in one single circuit board, which reduces the amount of various alternative circuits boards for various markets. Three exemplifying alternatives for MOSFET-switches and the connections thereof are shown and described in more detail in connection with FIGS. 4a–c.

'Signalling out' ie. the line 13 is the output of one single signalling channel from the circuit board through the MOSFET switch means 14. A line 12 is provided for the input of external signalling voltage, which might be used for instance in occasions where voltages $U_b$ or OV (ground) are not suitable ones, eg. due to variations in ground potential. In the above the $U_b$ is the internal signalling voltage and in most cases corresponds to $U_{battery}$, for instance −48 V.

Figure 2:
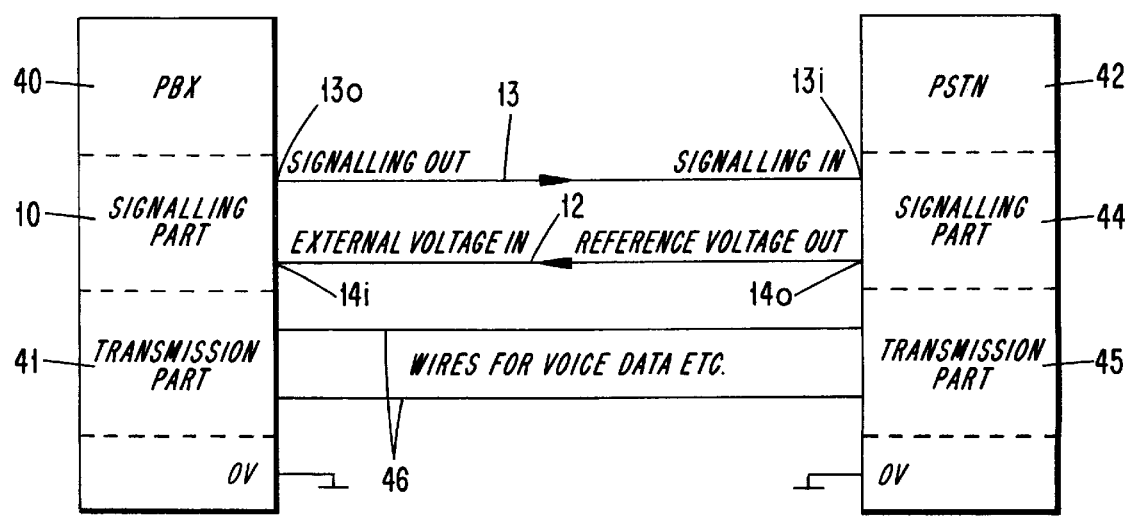
FIG. 2 is a schematic presentation of an arrangement according to the present invention.

FIG. 2 discloses one preferred arrangement utilizing the circuitry 10 of FIG. 1. A telephone switch 40 (PBX) is operationally connected to a public telephone exchange 42 or in general terms to PSTN (public switched telephone network) 42 through lines 12, 13 and 46. The arrangement of FIG. 2 utilizes the signalling voltage of the PSTN 42 as will be described below, whereby problems associated to earthing can be avoided. Therefore OV of FIG. 2 is not connected by any line.

The signalling line 13 connects the output 13o ('Signalling out') of the signalling part 10 of PBX 40 corresponding to circuitry 10 shown in FIG. 1 to an input 13i ('Signalling in') of a signalling part 44 of the PSTN 42. The voltage line 12 connects output 12o of the signalling part 44 of the PSTN ('Reference voltage out') to an input 14i of the signalling part 10 of the PBX ('External voltage in'). The respective transmission parts 41 of PBX 40 and 45 of PSTN 42 are connected through lines 46 enabling voice and/or data transmission or similar traffic between these two apparatus. A proper signalling line 13 is selected among various alternatives by the MOSFET switches, as is shown in FIG. 1.

The converter means and the MOSFET switches of the signalling part 10 and the connections thereof will now be described in more detail with reference to FIGS. 3 and 4a–c.

One possibility for the logic level converter 6 is shown in FIG. 3. The converter means 6 comprises a PNP-type bipolar transistor 17, an emitter 18 thereof being connected to a supply voltage of the controlling logic, ie. the control circuit, through line 21. In this example the supply voltage is shown to be +5V.

The converter means 6 input from the control circuit is designated by 3i,4i,5i and corresponds to the inputs 3i, 4i and 4i shown in FIG. 1. A resistor 16 is mounted in an input line 22 between said input and base 19 of the transistor 17. In addition to that, a further resistor 15 is provided between said input line 22 and said line 21. Said resistor 15 ensures a predefined threshold level ie. the level of the output voltage of the control circuit (coupled to the input 3i, 4i, 5i). The switching level defines the level at which said transistor is in conductive state and at which level it is in nonconductive state. The output (ie. 7o, 8o and 9o in FIG. 1) of the converter means 6 is arranged through a collector 20.

The above can also be explained by more general terms: The transistor 17 is conductive, ie. a current is conducted from the emitter 18 to the collector 20 only when a current is conducted from the emitter 18 to the base 19. A suitable current can be conducted from the emitter to the base by connecting the input to a logical zero, which is approximately zero Volts in this example. In such case the collector 20, ie. the output, will be connected to the supply voltage, ie. to +5V. The transistor 17 will be nonconductive, ie. the output will be open, if the input is connected to a logic one, which in the example would be about +5V. In practice said logical levels can be different from the above, such as "0"=<0,8V and "1"=>2,4V.

Figures 4A, 4B, 4C:
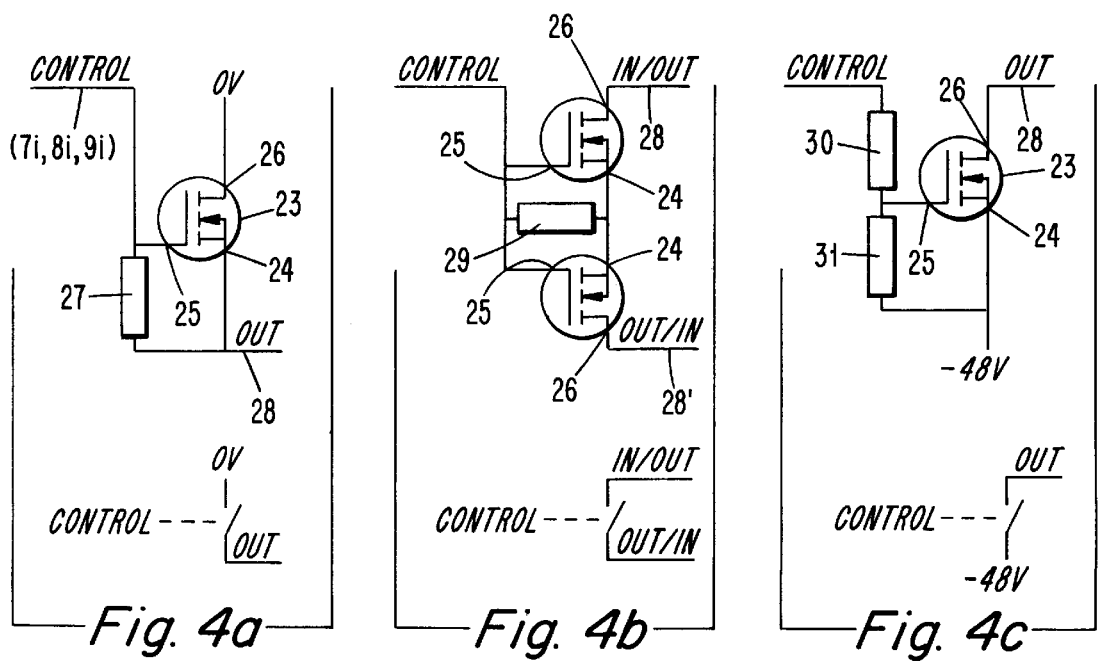
FIGS. 4a, 4b and 4c are schematical presentations of various ways to connect MOS-transistors.

Said collector 20 or output is, in turn, connected to an input of a MOSFET switch, such as to the switch 14 shown in FIG. 1 and corresponding to the control inputs 7i,8i,9i of FIGS. 4a–c.

Before a detailed explanation of FIGS. 4a–c, a brief general explanation of two MOSFET types is given. A N-channel enhancement type MOSFET conducts current between a drain and a source when a voltage between a gate and the source exceeds a given threshold voltage. Another possible MOSFET is a depletion-type MOSFET. This conducts without any control, and becomes nonconductive when a control is provided. The main distinction between these two lies in that the directions of currents and voltages are different in N and P type MOSFETs. However, the exemplifying embodiments of this description use N-channel enhancement-type MOSFETs, as they are more commonly used at the present, and thus at present non-expensive and more readily available than the P-type MOSFETs.

FIG. 4a discloses a MOSFET switch comprising a single MOSFET 23 having a drain 26 connected to 0V. A resistor 27 is connected between a gate 25 and a source 24 and it holds the drain 26 open when no control is provided by the control input. When 'control' is connected to +5V eg. by the transistor 17 of FIG. 3, an output 28 will become connected to 0V with a low ohmic level (e.g. less than 1.0Ω, preferably less than 0.1Ω).

FIG. 4b discloses a MOSFET switch comprising two MOSFETs 23. This arrangement enables a connection which is not dependent from the polarity of current. In use, only the other one of the MOSFETs is used, while the other is passed by an efficient internal diode (not shown, but well known by the skilled person). By having it's drain 26 connected to a more positive voltage, the current flows via that MOSFET.

The current may be conducted in a similar manner between output poles 28 and 28' when the control input is connected to said +5V. No current will be conducted when the 'control' is left open. A resistor 29 ensures then that the gate 25 will be connected to the same potential as the source 24 is, ie. the MOSFET will be in a nonconductive state.

In the third alternative disclosed in FIG. 4c a negative voltage (or current) is connected 'out' at 28. In this case two resistors 30 and 31 are required to ensure a proper gate-source voltage as the MOSFET 23 is controlled. The resistor 30 is required when the MOSFET switch is controlled to be conductive by said +5V, since the MOS transistors in general do not withstand high potential differences between the gate and the source.

Symbols for the possible switches are also disclosed in FIGS. 4a–c.

According to the present invention a circuit board is reset and activated by means of software adapted to control and select a proper signalling channel 13. The activation includes setting of the board with information about the market and timing parameters etc. A central processing unit CPU may be operationally connected to the board and contains information about switches which need to be used and in which trunk line said switches need to be used, and is thus able to control the board and to select between the different signalling systems by selecting proper signalling channels 13 by means of logical values, such as by ones ("1") and zeroes ("0"). A program including said information about the necessary markets is stored in a ROM memory. RAM memory means of the control means may be used as a short time storage for the data, e.g. during the setting procedure. An I/O-circuit (Input/Output-circuit) may be used as an interface between CPU and high voltage switches. The I/O circuit can be a separate latch or similar device.

Thus, the invention provides an apparatus and a method by means of which a significant improvement is achieved when selecting a proper signalling system. It should, however, be noted that the foregoing examples of the embodiments of the invention are not intended to restrict the scope of the invention defined in the appended claims.

I claim:

1. A method for selecting a signalling system, comprising the steps of storing an information about various parameters of alternative signalling systems of different markets into a memory means of an arrangement, selecting one of the stored alternative signalling systems by programmable control means, transmitting a logical value corresponding said selected signalling system to field effect type switching means provided in the arrangement, and controlling said field effect type switching means by an electrical control signal such that the s elected signalling system is provided.

2. A method according to claim 1, wherein said transmitting further includes a step for converting said logical value by converting means to an electrical control signal.

3. A method according to claim 1, wherein said field effect type switching means a re including at least one MOS transistor, said MOS transistor being controlled by volt age or by current.

4. A method according to claim 1, wherein an external signalling voltage is supplied to an input of said field effect type switching means.

5. A method according to claim 1, wherein the circuitry for selecting a signalling system is connected operationally to a telecommunication switch to provide a signalling output of said switch, said output being compatible with a signalling system used by a given telecommunication network.

6. A control arrangement for selecting a signalling system having different current/voltage levels, comprising:

a memory means for storing information about various parameters of alternative signalling systems of different markets, programmable control means operationally connected to said memory means for selecting one of the alternative signalling systems, and at least one field effect type switching means operationally connected to said programmable control means, said at least one field effect type switching means being capable of providing the selected signalling system and being provided with an output for a signalling channel.

7. A control arrangement according to claim 6, further comprising logic level converting means provided between said programmable control means and said at least one field effect type switching means.

8. A control arrangement according to claim 6, wherein said field effect type switching means is provided by a MOS transistor switch.

9. A control arrangement according to claim 8, wherein said MOS transistor switch comprises at least two MOS transistors, the arrangement being such that a connection which is not dependent from the polarity of current is enabled.

10. A control arrangement according to claim 6, wherein said logic level converting means comprise a PNP-type bipolar transistor, an emitter thereof being connected to a supply voltage of said programmable control means and a collector thereof being an output for the control signal for the field effect type switching means.

11. A control arrangement according to claim 6, wherein an external signalling voltage supply is arranged to an input of said field effect type switching means.

12. A control arrangement according to claim 6, wherein said arrangement for selecting a signalling system is operationally connected to a telecommunication switch to provide a signalling output of said switch, said output being compatible with a signalling system used by a given telecommunication network.

13. A switching system for telecommunications, said switching system comprising a memory means for storing information about various parameters of alternative signalling systems of different markets, programmable control means operationally connected to said memory means for selecting one of the alternative signalling systems, and at least one field effect type switching means operationally connected to said programmable control means, said at least one field effect type switching means being capable of providing the selected signalling system and being provided with an output for a signalling channel, whereby the switching system is provided with a control arrangement for selecting a signalling system having different current/voltage levels.

* * * * *